United States Patent [19]

Nakatani et al.

[11] 4,408,292
[45] Oct. 4, 1983

[54] DATA PRINT CONTROL IN AN ELECTRONIC CASH REGISTER

[75] Inventors: Hiroshi Nakatani, Yamatokoriyama; Hachizou Yamamoto, Nara, both of Japan

[73] Assignee: Sharp Kabushiki Kaisha, Osaka, Japan

[21] Appl. No.: 188,564

[22] Filed: Sep. 18, 1980

[30] Foreign Application Priority Data

Sep. 27, 1979 [JP] Japan .................................. 54-124858
Sep. 27, 1979 [JP] Japan .................................. 54-124859
Sep. 27, 1979 [JP] Japan .................................. 54-124860

[51] Int. Cl.³ ...................... G06F 15/20; G06F 15/22
[52] U.S. Cl. ................................. 364/405; 364/710; 364/900; 235/60 P; 235/2
[58] Field of Search ... 364/404, 405, 710, 200 MS File, 364/900 MS File; 340/723, 750; 235/3, 60 P, 2, 17

[56] References Cited

U.S. PATENT DOCUMENTS

| 3,895,375 | 7/1975 | Williams | 340/723 |
| 3,903,517 | 9/1975 | Hafner | 340/750 |
| 4,037,207 | 7/1977 | Birney et al. | 364/200 |
| 4,037,214 | 7/1977 | Birney et al. | 364/200 |
| 4,093,987 | 6/1978 | Gaudette et al. | 364/200 |
| 4,138,733 | 2/1979 | Tadakuma et al. | 364/405 |
| 4,142,235 | 2/1979 | Tadakuma et al. | 364/405 |
| 4,149,152 | 4/1979 | Russo | 340/750 |
| 4,159,533 | 6/1979 | Sakurai | 364/405 |
| 4,193,112 | 3/1980 | Gilbert et al. | 364/200 |
| 4,237,541 | 12/1980 | Mikada | 364/900 X |
| 4,241,401 | 12/1980 | De Ward et al. | 364/200 |
| 4,245,311 | 1/1981 | Nakamura | 364/405 |
| 4,261,036 | 4/1981 | Nagasaka et al. | 364/405 |
| 4,276,598 | 6/1981 | Inoue et al. | 364/405 |

Primary Examiner—Mark E. Nusbaum
Assistant Examiner—William G. Niessen
Attorney, Agent, or Firm—Brich, Stewart, Kolasch & Birch

[57] ABSTRACT

An electronic cash register includes a printer system for printing out a transaction data on a receipt bill or a journal paper. A print preset system is provided for selectively printing out the transaction data. A print inhibition preset key develops a print inhibition command which is stored at the last bit of a memory address of the corresponding transaction data. In a normal registration operation mode, a signal detection circuit functions to detect the print inhibition command stored in the last bit. When the print inhibition command is detected, the signal detection circuit functions to preclude the transaction data stored in the corresponding memory address from being transferred to the printer system.

1 Claim, 1 Drawing Figure

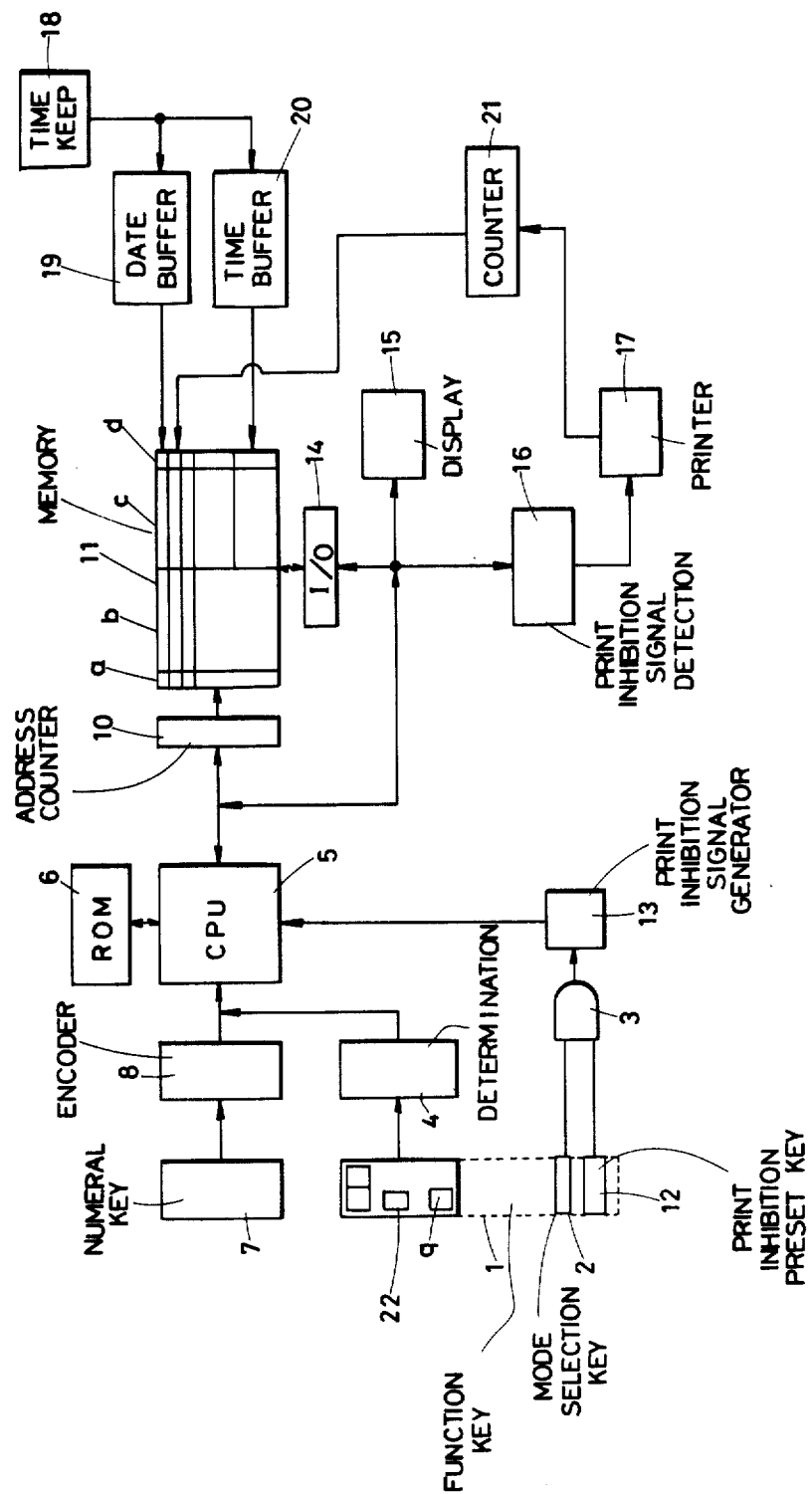

DATA PRINT CONTROL IN AN ELECTRONIC CASH REGISTER

BACKGROUND AND SUMMARY OF THE INVENTION

The present invention relates to an electronic cash register and, more particularly, to a print control system in an electronic cash register.

The electronic cash register is widely used in various stores and markets. The electronic cash register includes a printer system for printing out a preselected data on a receipt bill or a journal paper. There is a possibility that the data which should be printed out varies in accordance with the scale of the store and the type of business. To satisfy this requirement, the electronic cash register is sometimes designed for a specific store. This precludes the mass production of the electronic cash register.

Accordingly, an object of the present invention is to provide an electronic cash register suited for the versatile use.

Another object of the present invention is to provide a novel print control system in an electronic cash register.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a data print preset system is provided for presetting a print condition of preselected data information. If the preselected data is desired not to be printed out on a receipt bill or a journal paper, a print inhibition signal is introduced through a print inhibition preset key and stored in a memory at a position corresponding to the preselected data. In a normal registration operation mode, the preselected data followed by the print inhibition signal is never printed out on the receipt bill or the journal paper.

BRIEF DESCRIPTION OF THE DRAWINGS

The present invention will be better understood from the detailed description given hereinbelow and the accompanying drawing which is given by way of illustration only, and thus is not limitative of the present invention and wherein:

The single FIGURE of the drawing is a block diagram of an embodiment of a data print control system in an electronic cash register of the present invention.

DESCRIPTION OF THE PREFERRED EMBODIMENTS

A data print control system in an electronic cash register of the present invention comprises a data print preset system for presetting the print condition, and a detection circuit for determining the print condition in a normal registration operation mode. More specifically, the data print control system comprises a central processor unit 5, a main memory 11, a print inhibition preset key 12 for presetting the print condition, a print inhibition signal generator 13, and a print inhibition signal detection circuit 16. Detailed construction of the print control system of the present invention will be described in conjunction with a preset mode and a normal registration mode.

(PRESET MODE)

A mode selection key 2 included in function keys 1 is provided for implementing a preset mode. A preset mode signal derived from the mode selection key 2 is applied to an AND gate 3 to place the AND gate 3 in an operative condition, and is also applied to the central processor unit 5 through a key determination circuit 4 to indicate that the electronic cash register is in the preset mode. In response to the preset mode signal derived from the mode selection key 2, the central processor unit 5 selects a preset routine stored in a read only memory 6. The read only memory 6 stores various programs related to transaction processings.

The main memory 11 includes a number of memory sections for memorizing transaction information. As shown in the following TABLE I, date information, receipt serial number, machine number, clerk code information and time information are stored in addresses 50 through 55 of the main memory 11 in the binary code notation.

TABLE I

| ADDRESS | (MEMORY -11-) INFORMATION STORED |
|---------|----------------------------------|
| 50 | date |
| 51 | receipt serial number |
| 52 | machine number |
| 53 | clerk code |
| 55 | time |

The machine number is a fixed number assigned to the electronic cash register. A time information keeping circuit 18 is provided for updating the date information stored in the address 50 through a date buffer 19, and the current time information stored in the address 55 through a time buffer 20. A counter 21 is associated with a printer system 17 for incrementing the receipt serial number stored in the address 51 upon every issue of the receipt bill. A clerk code key 22 is included in the function keys 1 for introducing the clerk code number into the address 53 through the use of numeral keys 7.

The last n bit in the addresses 50 through 55 is assigned to store a binary code signal "1" or "0" which indicates whether the corresponding data should be printed out on the receipt bill or the journal paper, or the corresponding data should not be printed out. The following TABLE II shows an example of the memory condition in the addresses 50 through 55.

TABLE II (MEMORY -11-)

| ADDRESS | BIT 1 2 3 ... n |
|---------|-----------------|
| 50 (date) | 0 |
| 51 (receipt serial number) | 0 |
| 52 (machine number) | 1 |
| 53 (clerk code) | 1 |
| 55 (time) | 0 |

The memory condition shown in the above TABLE II indicates that the date information, the receipt serial number and the time information should be printed out, and the machine number and the clerk code information are not required to be printed out. To preset the above discussed print condition, the address corresponding to the information which is not required to be printed out is selected through the use of the numeral keys 7. Numerals keys 5 and 2 are successively actuated to introduce numeral information "52" into the central processor unit 5 through a key encoder 8. Then, a print selection key 9 included in the function keys 1 is actuated to instruct the central processor unit 6, via the key determination circuit 4, that the numeral information is the address information. In response to the actuation of the print selection key 9, the central processor unit 5 selects, in accordance with the program control stored in the read only memory 6, a section d of the address 52 in the main memory 11 via an address counter 10. Thereafter, the print inhibition preset key 12 included in the function keys 1 is actuated to enable the print inhibition signal generator 13 via the AND gate 3. The print inhibition signal generator 13 develops a high level signal "1" which is introduced into and stored in the section d of the address 52 in the main memory 11 via the central processor unit 5 and an input/output circuit 14. In this way, the print control system is preset not to print out the machine number stored in the address 52.

The section d of the address 53 in the main memory 11 is also selected in the same manner as discussed above through the use of the numeral keys 7 and the print selection key 9. The print inhibition preset key 12 is actuated to introduce the information "1" into the section d of the address 53 in the main memory 11, whereby the print control system is preset not to print out the clerk code information stored in the address 53.

(NORMAL REGISTRATION MODE)

The mode selection key 2 included in the function keys 1 is also provided to implement a normal registration mode. When a specific transaction occurs, a unit price value and number or quantity information are introduced from the numeral keys 7 into the central processor unit 5 through the key encoder 8. A desired department key included in the function keys 1 is actuated to indicate the related department. The department signal is introduced into the central processor unit 5 through the key determination circuit 4. The central processor unit 5 functions to select a suitable address in the main memory 11 through the address counter 10, in accordance with the department signal derived from the key determination circuit 4, whereby the transaction data is introduced into a section b of the selected address in the main memory 11 through the input/output circuit 14. These operations are controlled by a program data stored in the read only memory 6.

During these operations, the introduced transaction information is displayed on a display unit 15. And, a preselected data is printed out on a receipt bill or on a journal paper by the printer system 17. More specifically, regarding the information stored in the addresses 50 through 55, the print inhibition signal detection circuit 16 monitors the last bit of the addresses 50 through 55. If the information "1" is stored at the last bit, the print inhibition signal detection circuit 16 functions not to transfer the data stored at the corresponding address toward the printer system 17. Accordingly, in the above-mentioned example, the machine number and the clerk code information are not printed out on the receipt bill or the journal paper. Remaining data are printed out on the receipt bill or the journal paper by the printer system 17.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A data print control system in an electronic cash register comprising:
   a printer system for printing said data;
   memory means having locations defined by a location address, said locations each having a first memory section for storing information data therein and a second memory section for storing a code signal instructing said printing system as to whether a printing operation should or should not be performed with respect to said information data, said memory means locations each including a plurality of said first and second memory sections for storing different types of said information data and corresponding code signals for each of said types, said code signals instructing said printer system whether or not to print information data stored in said memory means at the location address selected by said first key input means;
   time information generation means for generating date information and time information; said date and time information comprising information data for storage in said first memory section;
   counter means operatively associated with said printer system for incrementing a receipt serial number stored therein, said receipt serial number comprising information data for storage in said first memory section;
   means for introducing said information data into the first memory sections of said locations;
   first key input means for selecting one of said location addresses;
   control means for addressing the second memory section at said memory location address selected by said first key input means; and
   print preset key means for introducing a code signal into the second memory section corresponding to said selected location address, said print preset key means developing a high level logic signal when the information data stored in the first memory section at the selected one of said location addresses is not required to be printed, whereby a high level logic code signal is stored in said second memory section associated with said selected location address;
   detection means for reading said code signals and selectively transferring said types of information data stored in said first memory sections to said printer for printing in accordance with the logic levels of the respective code signals, said detection means functioning to prevent the transferring of said information data stored in the first memory section when the associated second memory section has a high level logic signal stored therein;
   said first and second memory sections at each location occupying adjacent bits in memory, said second memory section occupying the last bit at each address.

* * * * *